United States Patent [19]
Sherwood et al.

[11] 4,414,256
[45] * Nov. 8, 1983

[54] CHEMICALLY WETTED FILM OF METAL PHASE ON GRAPHITE AND PROCESS FOR PREPARING SAME

[75] Inventors: Rexford D. Sherwood, Suffern, N.Y.; Rees T. K. Baker, Murray Hill, N.J.; Eric G. Derouane, Namur, Belgium; Wim J. M. Pieters, Morristown, N.J.

[73] Assignee: Exxon Research and Engineering Co., Florham Park, N.J.

[*] Notice: The portion of the term of this patent subsequent to Feb. 2, 1999 has been disclaimed.

[21] Appl. No.: 222,644

[22] Filed: Jan. 5, 1981

[51] Int. Cl.³ .............................................. B01J 21/18
[52] U.S. Cl. ..................... 428/163; 428/164; 428/167; 428/408; 156/646; 156/647; 156/654; 502/182; 502/185
[58] Field of Search ............... 252/447, 445; 428/408, 428/163, 164, 161, 167; 48/197 R; 427/307, 316; 156/647, 654, 668, 635, 646

[56] References Cited

U.S. PATENT DOCUMENTS 4,313,853  2/1982  Sherwood et al. ............. 252/447 X
4,347,063  8/1982  Sherwood et al. ............... 48/197 R

OTHER PUBLICATIONS

*Journal of Catalysis,* vol. 66, Dec. 1980, pp. 451–462, Keep et al., "Studies of the Nickel-Catalyzed Hydrogenation of Graphite".

*Primary Examiner*—Alexander S. Thomas
*Attorney, Agent, or Firm*—Edward M. Corcoran

[57] ABSTRACT

A composition of matter and method for the preparation thereof wherein said composition comprises a film of chemically wetted metal phase essentially a monolayer thick on graphite wherein said metal is selected from the group consisting essentially of Ni, Co, Mo and mixtures thereof. These metal films exhibit strong metal-support interaction and do not exhibit properties of the bulk metal.

8 Claims, 1 Drawing Figure

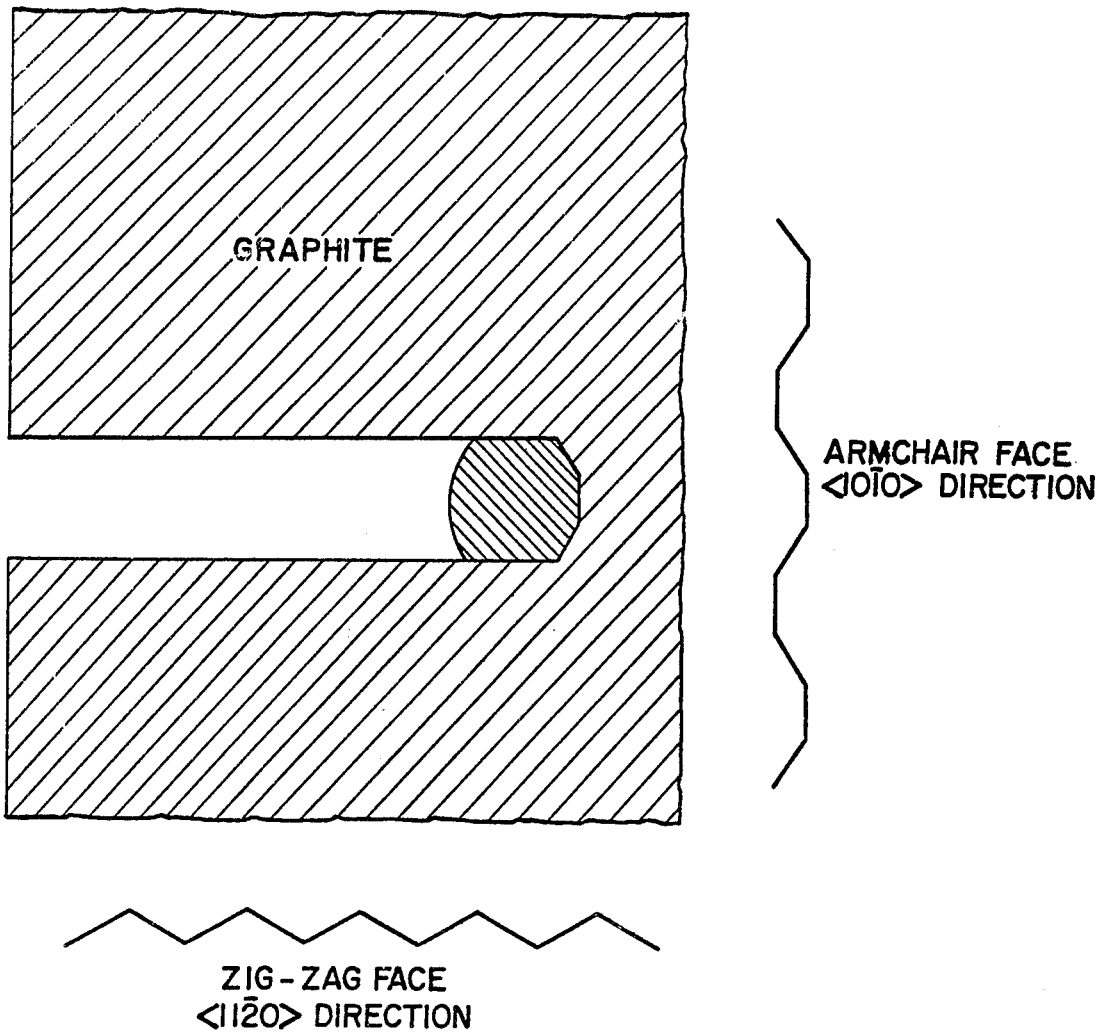

CHEMICALLY WETTED FILM OF METAL PHASE ON GRAPHITE AND PROCESS FOR PREPARING SAME

BACKGROUND OF THE INVENTION

1. Field of the Invention

This invention relates to a thin film of metal phase on graphite. More particularly, this invention relates to a thin film of chemically wetted metal phase on graphite and a process for preparing same wherein said metal is selected from the group consisting essentially of Ni, Co, Mo and mixtures thereof.

2. Summary of the Invention

A composition of matter has been discovered which comprises a thin film of chemically wetted metal phase on graphite wherein said metal is selected from the group consisting essentially of Ni, Co, Mo and mixtures thereof. By chemically wetted is meant that the metal wets and chemically bonds to the surface of the channels in the graphite. While not wishing to be held to any particular theory, it is believed that the metal films of this invention are approximately one monolayer thick. These films are unique compositions of matter in themselves inasmuch as they exhibit strong metal-support interaction and possess properties other than those of the bulk metal. The term "metal phase" thus refers to those unique films. These films are useful as precursors in forming dispersions of the metal on the graphite support. It is well known in the art that dispersions of these metals on a graphite support are known to be useful catalysts, such as hydrogenation catalysts.

The compositions of this invention are formed via a process which comprises the sequential steps of (a) heating a composite of said metal and graphite in an inert, hydrogen-containing atmosphere at a temperature of from about 800°–975° C. for a time sufficient for the metal to form a plurality of metal-containing channels in the graphite, and (b) heating the metal-containing, channeled composite formed in (a) to a temperature of at least about 975° C. in an inert, hydrogen-containing atmosphere for a time sufficient for the metal in said channels to spread out and chemically wet at least a portion of the surface of said channels as a thin film of metal phase. Preferred metals are Ni and Co and a particularly preferred metal is Ni.

By graphite is meant graphite or mixture of graphitic and non-graphitic material. This includes relatively pure forms of a graphite such as graphite single crystals and Grafoil as well as mixtures of graphite with other materials. Illustrative but non-limiting examples of mixtures of graphite with other carbonaceous materials include asphalt, pitch, coke formed as a result of various hydrocarbon conversion reactions in petroleum refineries and petrochemical plants, etc., as well as coke formed on catalysts containing Ni, Co, Mo and mixtures thereof. As is well known to those skilled in the art, crystalline forms of carbon such as graphite have a basal plane or a-face (<1120> direction) plane and a plane perpendicular to the basal plane which is a c-face (<1010> direction). In the process of this invention, particles of the metal create channels in the c-face parallel to the a-face by catalytically gasifying the graphite with hydrogen. This increases the surface area of the c-face. It has been found that the metal will channel into the c-face surface and chemically wet the soformed channels, but will not channel into the a-face or basal planes. It has also been found that if the graphite is mixed with non-graphitic or amorphous carbon, the channeling metal particles will continue to channel into and gasify the amorphous carbon. Thus, the channeling metal particles will gasify a mixture of graphite and non-graphitic or amorphous carbon.

As has heretofore been stated, metals that have been found to be useful for the composition of matter of this invention are Ni, Co, Mo and mixtures thereof. Nickel and cobalt are preferred and nickel is particularly preferred as the metal. It is understood, of course, that the process of forming the catalyst of this invention may start with a composite of the metal and graphite or graphite-containing material. Illustrative, but non-limiting examples include coke deposited on a metal surface containing one or more of said metals, such as coked steam cracker tubes, coked catalysts, etc. Alternatively, the metal may be added to the graphite or graphite-containing support by any convenient means known to those skilled in the art. Illustrative, but non-limiting examples include evaporating the metal onto the graphite in a vacuum, plasma or flame spraying the metal onto the support and various wet chemistry techniques employing metal precursors such as impregnation, incipient wetness, etc., followed by drying the contacting with a reducing atmosphere at elevated temperature to insure that the deposited metal is in the reduced, metallic form. Reducing the metal may be part of the heating step of the process wherein the composite is heated in a hydrogen atmosphere to form metal-containing channels in the graphite support. Metal precursors may be initially present on the graphite in the form of a metal salt or oxide such as carbonate, bicarbonate, sulfate, nitrate, etc., the main criterion being that the metal precursor be capable of decomposing to or being reduced to the metal at a temperature below about 875° C. and preferably below about 800° C.

The metal-graphite composite must be heated in an inert, hydrogen-containing atmosphere at a temperature within the range of from about 800°–975° C. for a time sufficient for the metal to form a plurality of metal-containing channels in the graphite. By inert, hydrogen-containing atmosphere is meant an atmosphere that is net reducing to both the metal and the graphite and which will not adversely affect either the graphite support, the metal, or the gasification reaction. Enough hydrogen must be present to catalytically gasify and channel the graphite. The hydrogen may be initially present therein or it may be formed, in-situ by using a mixture of, for example, steam and ethane and other mixtures of steam and saturated hydrocarbons such as paraffins and saturated cyclic hydrocarbons. The temperature range for channeling is critical inasmuch as channels will not be formed at temperatures below about 800° C. At temperatures above about 975° C., in an inert, hydrogen-containing atmosphere, the metal will spread out and chemically wet the channels as a thin film at which point catalytic gasification and channeling cease. Channeling temperatures of from about 800°–975° C. are preferred and particularly preferred are temperatures within the range of from about 800°–925° C.

When the metal channels into the c-face of the graphite, it does so by catalytically gasifying the carbon with hydrogen to form a gas such as methane. The figure schematically illustrates gasification and channeling of the graphite by a globule of nickel of about 500Å in diameter. In a preferred embodiment of the invention, the metal-graphite composite will be heated within this temperature range in an inert, hydrogen-containing atmosphere for a time sufficient to achieve from about 5-20 wt. % gasification of the graphite support. Unless catalytic gasification of the graphite or graphite-amorphous carbon mixture is the desired result it is preferred that the total catalytic gasification of the graphite due to the channeling not exceed about 25 wt. % of the graphite. In practice, it has been found that the gasification rate of the graphite is roughly proportional to the concentration of metal thereon up to about 5 wt % metal. As the amount of metal on the graphite exceeds about 5 wt %, the gasification rate approaches a constant value.

After channeling of the graphite support has proceeded to the desired level, as evidenced by the amount of gasification of the graphite, the temperature is raised above about 975° C. at which point the metal in the channels spreads out and chemically wets the surface of the so-formed channels as a film of metal phase and catalytic gasification ceases. As stated before, it is believed that the metal chemically wets the channels as a film approximately one monolayer thick. The metal film exhibits strong interaction with the graphite support and is in itself a unique composition of matter inasmuch as it does not exhibit the properties of the bulk metal. Thus, the term "metal phase" refers to this unique film. In order for this metal-wetting to occur, it is important that the metal-graphite composite be in contact with an inert, hydrogen-containing atmosphere. This atmosphere must be net reducing with respect to both the metal and graphite support. A preferred temperature range for the wetting and metal phase film forming step will range from about 975° to 1150° C., the upper limit being governed by noncatalytic gasification of the graphite which begins to occur at about 1200° C. in the presence of hydrogen. However, if necessary, one can exceed the upper limit of 1150° C. without adversely effecting the metal wetted surface of the composite. One merely loses more graphite support.

BRIEF DESCRIPTION OF THE DRAWINGS

The FIGURE is a schematic illustration of a globule of metal about 500Å in diameter channeling into the c-face of graphite.

EXAMPLES

The invention will be more readily understood by reference to the examples below.

EXAMPLE 1

Spectrographically pure nickel (99.9% pure) was deposited onto transmission specimens of single crystals of graphite (Ticonderoga, New York State) as a monolayer film approximately one atom thick by evaporation from a heated tungsten filament at a residual pressure of $5 \times 10^{-6}$ Torr. These nickel-containing specimens were placed in a controlled atmosphere electron microscope (CAEM) for the experimental work. Ethane 99.999% pure (Scientific Gas Products) was bubbled through water at 0° C. to generate a 40/1 ethane/water gas mixture which was then passed through the CAEM at a pressure of 1.0 Torr. As the nickel/graphite specimens were heated in the ethane/steam atmosphere in the CAEM, sporadic nucleation of the evaporated nickel film into small discrete particles was observed at a temperture of about 750° C. Those skilled in the art will know that the ethane/steam mixture formed hydrogen in-situ in the CAEM on contact with the nickel/graphite specimens. As the temperature was gradually raised to 890° C. particle nucleation and growth became more extensive and the first signs of catalytic attack were observed. This action was seen as the creation of very fine straight channels parallel to the a-face (<1120>) and perpendicular to the c-face produced by metal particles 50-150Å diam.) which had collected at edges and steps on the surface. As the temperature was raised both the depth and size of particles propagating channels increased. At any given temperature it was apparent that the largest particles were producing channels at the fastest rates. Catalytic action increased in intensity until the temperature reached about 1000° C., when many of the narrower channels suddenly became devoid of catalyst particles at their head. This behavior became more generalized at 1050° C., extending to include even the larger particles (5,000Å) and was identical in every respect to that observed for nickel/graphite specimens in a hydrogen atmosphere set forth in Example 4 below. Ultimately the channeling ceased as the nickel particles became completely disseminated. Continued heating up to 1250° produced no further catalytic action or restoration of the original particles and only at the highest temperature were indications of uncatalyzed gasification of graphite apparent. Discrete nickel particle formation was achieved again by treating these inactive specimens in oxygen at 850° C.

EXAMPLE 2

In this example, nickel/graphite specimens produced as in Example 1 were placed in the CAEM in the presence of pure (99.999%) oxygen at a pressure of 5 Torr. Nucleation of nickel particles was essentially complete at about 635° C. As the temperature was slowly raised, there was very little evidence of catalytic gasification. The experiment was concluded at 1150° C. due to vigorous, uncatalyzed gasification of the graphite which often resulted in specimen disintegration.

EXAMPLE 3

This experiment was similar to that of Examples 1-2, except that the atmosphere in the CAEM was 1 Torr dry hydrogen (99.999% pure). Nickel particle nucleation commenced at about 755° C. with catalytic attack of the graphite commencing at about 845° C. which was seen as the development of fine channels parallel to the a-face of the graphite surface. As the temperature was raised, both the size and the number of channeling particles increased. The channels were up to 1500Å in width, had many straight sections interrupted by changes in direction of 60° C. or 120° C., and were orientated parallel to (1120) directions. There were also examples of particles possessing hexagonal facets at the graphite-catalyst interface which were orientated parallel to (1010) directions.

On continued reaction it became evident that the channeling nickel particles were wetting the channels formed in graphite thereby leaving material on the sides thereof. As a consequence the nickel catalyst particles became smaller giving the channels a tapered appearance and, ultimately when all the catalyst was depleted, channels ceased to develop. The thickness of the nickel film formed on the surfaces of the channels was less than the 25Å resolution of the CAEM. This wetting phenomenon, which started at 980° C., was essentially complete by the time the temperature had been raised to 1098° C. Continued heating in hydrogen up to 1250° C. produced no further catalytic action or restoration of the original particles and only at the highest temperature was it possible to detect signs of uncatalyzed attack. Subsequent cooling or heating in vacuum produced no change in specimen appearance, indicating that the metal-support interaction was very strong. It was significant that inactive particles remained static on the surface and showed less tendency to lose material during the reaction. If hydrogen was replaced by oxygen and the specimen reheated, then at 850° C. small particles less than about 25Å diameter, started to reform along the edges of the original channels. This observation supported the idea that particle shrinkage in hydrogen was due to film formation along channel edges rather than volatilization. Eventually at 1065° C. in oxygen these particles proceeded to cut very fine channels emanating from the edges of the original channels.

EXAMPLE 4

This experiment was similar to those of Examples 1-4, except that the atmosphere in the CAEM was hydrogen/steam at a 40/1 ratio. The results were similar to those obtained in Example 4, except that channeling occurred at about 780° C. and uncatalyzed attack occurred at about 1150° C. Thus, in oxidizing environments the major source of carbon gasification was due to uncatalyzed attack by the oxidizing atmosphere (Examples 2) whereas in the hydrogen-containing atmosphere, which were net reducing with respect to the nickel (Examples 1, 4 and 5) the carbon gasification was virtually completely catalytic. The most significant aspect of these examples resides in the discovery that, in an inert, hydrogen-containing atmosphere (net-reducing), the nickel spread out and wetted the soformed channel surfaces and that if the so-formed nickel film was exposed to an oxidizing atmosphere (i.e., $O_2$ or $H_2O$), discrete particles of nickel formed from the film on the channel surfaces and the catalytic gasification process could be repeated if one then switched back to an inert, hydrogen-containing atmosphere. The cycle of channeling, wetting and redispersion of the nickel into discrete particles could be repeated indefinitely until there was virtually no graphite left.

EXAMPLE 5

This experiment was identical to that of Example 1, except that the atmosphere in the CAEM was ethane/hydrogen/steam in a ratio of approximately 38/2/1, respectively. Nickel particle nucleation occurred at about 750° C., but was much crisper than that in Example 1 and channeling occurred at about 845° C. The presence of 5 % hydrogen in the ethane/steam mixture of Example 1 resulted in a fivefold increase in the rate of the nickel catalyzed gasification of the graphite.

EXAMPLE 6

This example demonstrates the unusual and unique hydrogen chemisorption properties of the wetted nickel film on the channel surfaces of the graphite. Nickel on Grafoil specimens were prepared using an incipient wetness technique. 5 mm disks of Grafoil were soaked in a solution of nickel acetate in methanol for one-half hour at 80° C. after which the Grafoil disks were dried for eight hours at 120° C. and washed with methanol to remove the excess nickel salt to produce a nickel/Grafoil precursor. The unreduced nickel content of this precursor material was 2.7 wt. percent. This precursor was reduced for two hours at 600° C. in pure hydrogen to produce nickel/Grafoil specimens. Specific details of the subsequent experiments are given in Tables 1-3 which was summarized below.

Following reduction at 600° C., the nickel/Grafoil specimens adsorbed (per gram) 0.080 cc of hydrogen, of which 0.048 cc was reversibly adsorbed, at an equilibrium hydrogen pressure of 0.26 atm. Under the same conditions, but following an additional treatment in hydrogen at 1100° C. for one hour, the nickel/Grafoil did not show any hydrogen chemisorption capacity which indicates a modification in the hydrogen chemisorption properties of nickel in the new state produced by the latter treatment. When this material was steamed at 1000° C. in a $H_2O$:He stream (1:40) for one to two hours; the hydrogen capacity was partially restored as 0.043 cc of hydrogen could be chemisorbed. By further re-reduction at 600° C. for 0.5 hours, the latter value was increased to 0.052 cc of hydrogen per gram of catalyst. It was then concluded that steaming the modified nickel/Grafoil composite restored the original chemisorption properties of the nickel.

This example demonstrates that:

treatment in hydrogen at 1000°-1100° C. of nickel on graphite (Grafoil) leads to a new chemical state of nickel in which the metal does not show its usual hydrogen chemisorption properties, the new chemical state of nickel or graphite (Grafoil) that can be prepared by the above treatment can be broken to regenerate the nickel film as small nickel particles which chemisorb hydrogen.

Additional experiments employing ferromagnetic resonance studies of the nickel/Grafoil specimens supported the hydrogen chemisorption studies and reinforced the conclusions that a film-like nickel phase formed by wetting in the channels and that this phase strongly interacts with the Grafoil support and contains very little dissolved carbon.

TABLE 1

TREATMENTS AND HYDROGEN CHEMISORPTIONS ON NICKEL/GRAPHOIL

| | Temperature | Temperature (°C.) | Measurements |
|---|---|---|---|
| A | Reduction in $H_2$ ⎫ | 600 | |
| | Evacuation ⎬ a | 550 | |
| | Evacuation ⎭ | 25 | |
| | Chemisorption of $H_2$ | 25 | $C_1, C_2$ |
| | Treatment in $H_2$ ⎫ | 1095 | |
| | Evacuation ⎬ b | 550 | |
| | Evacuation ⎭ | 25 | |
| | Chemisorption of $H_2$ | 25 | $C_3, C_4$ |
| | Treatment in $H_2$ | 1000 | |
| | Evacuation | 500 | |
| | Desorption | 1000 | $D_1$ |
| | Evacuation | 950 | |
| | Evacuation | 25 | |
| | Chemisorption of $H_2$ | 25 | $C_5$ |
| | Steaming | 800 | |
| | Purging in He ⎫ | 300 | |
| | ⎬ c | | |
| | Evacuation ⎭ | 25 | |
| | Chemisorption of $H_2$ | 25 | $C_6$ |
| | Steaming | 1000 | |
| | c | | |
| | Chemisorption of $H_2$ | 25 | $C_7$ |
| B | a + b | | |
| | Chemisorption of $H_2$ | 25 | $C'_3$ |
| | Steaming | 1000 | |
| | c | | |
| | Chemisorption of $H_2$ | 25 | $C'_6$ |
| | Treatment in $H_2$ | 600 | |
| | Evacuation | 25 | |
| | Chemisorption of $H_2$ | 25 | $C'_8$ |

TABLE 2

CHEMISORPTION OF HYDROGEN ON NICKEL/GRAPHOIL CATALYSTS

| Run | | Treatment[a] | Volume $H_2$ Adsorbed[b] |
|---|---|---|---|
| 1. | $C_1$ | Reduced 600° C., total | 0.080 |
| | $C_2$ | Reduced 600° C., reversible | 0.048 |
| | $C_3$ | Treated 1095° C. in $H_2$, 2 hrs | 0.020 |
| | $C_4$ | Evacuated 25° C., following $C_3$ | 0.023 |
| | $C_5$ | Evacuated 1000° C. | 0.0 |
| | $C_6$ | Steaming 800° C. | 0.0 |
| | $C_7$ | Steaming 1000°C. | 0.042 |
| 2. | $C'_3$ | Reduced 600° C., treated 1000° C. in $H_2$, 1 hr | 0.0 |
| | $C'_6$ | Steamed 100° C., 1 hr | 0.0425 |
| | $C'_7$ | Reduced 600° C. | 0.0525 |

[a]See Table 1 for details
[b]Value at an equilibrium pressure of 200 Torr.
cc $H_2$ STP/gram of catalyst.

TABLE 3

X-RAY DIFFRACTION AND CHEMISORPTION DATA ON TREATED NI/GRAPHOIL SPECIMENS

| | Treatment | $H_2$ Chemisorption and X-ray |
|---|---|---|
| 1. | Reduced at 600° C. | Large particles and normal $H_2$ chemisorption |
| 2. | Reduced at 600° C., treated in $H_2$ at 1000° C., evacuated at 950° C. followed by steaming at 800° C. | Smaller particles, but poor $H_2$ chemisorption, about zero (see $C_6$-Table 2). |

What is claimed is:

1. A composition of matter comprising a film of chemically wetted metal phase on graphite wherein said metal is selected from the group consisting essentially of Ni, Co, Mo and mixtures thereof and wherein said film is formed by:

(a) contacting a composite of said metal and graphite with a net-reducing, hydrogen-containing atmosphere at a temperature of from about 800°–975° C. for a time sufficient for said metal to form a plurality of metal-containing channels in said graphite; and (b) contacting said metal-containing, channeled composite formed in (a) with a net-reducing, hydrogen-containing atmosphere at a temperature above about 975° C. for a time sufficient for said metal in said channels to spread out and chemically wet at least a portion of the surface of said channels as a thin film of said metal phase.

2. The process of claim 1 wherein said contacting in step (b) occurs at a temperature of from between about 975° C.–1150° C.

3. A composition of matter comprising a film of chemically wetted metal phase on graphite, said metal film being on the surface of channels formed in said graphite by the catalytic gasification thereof, wherein said channels are parallel to the a-face of the graphite and wherein said metal is selected from the group consisting essentially of nickel, cobalt, molybdenum, and mixtures thereof.

4. The composition of claim 3 wherein said metal film exhibits strong metal-support interaction.

5. The composition of claim 4 wherein said metal film exhibits suppressed hydrogen chemisorption.

6. The composition of claim 5 wherein said metal film is approximately one monolayer thick.

7. The composition of either of claims 5 or 6 wherein said metal is selected from the group consisting essentially of nickel, cobalt and mixtures thereof.

8. The composition of claim 7 wherein said metal is nickel.

* * * * *